United States Patent [19]

Boy Marcotte et al.

[11] 4,116,765

[45] Sep. 26, 1978

[54] LIQUID METAL COOLED NUCLEAR REACTOR

[75] Inventors: Jean-Louis Boy Marcotte, Orsay; Georges Chevalier, Longjumeau; Janusz Gerij, St-Maur; Jacques Leheu, Drancy, all of France

[73] Assignee: Commissariat a l'Energie Atomique, Paris, France

[21] Appl. No.: 751,202

[22] Filed: Dec. 16, 1976

Related U.S. Application Data

[63] Continuation-in-part of Ser. No. 680,780, Apr. 27, 1976, abandoned.

[51] Int. Cl.² .............................................. G21C 11/08
[52] U.S. Cl. ........................................ 176/38; 176/87
[58] Field of Search ................... 176/87, 40, 65, 50, 176/38; 52/224, 248

[56] References Cited

U.S. PATENT DOCUMENTS

| | | | |
|---|---|---|---|
| 3,125,160 | 3/1964 | Long | 176/87 |
| 3,548,931 | 9/1970 | Germer et al. | 176/87 |
| 3,640,032 | 2/1972 | Jubb | 176/87 |
| 3,773,616 | 11/1973 | Aubert | 176/87 |
| 3,847,733 | 11/1974 | Ventre | 176/87 |
| 3,926,722 | 12/1975 | Dupen | 176/87 |
| 3,937,255 | 2/1976 | Barnert | 176/87 |
| 3,945,165 | 3/1976 | Lemercier | 176/87 |
| 3,945,887 | 3/1976 | Lemercier | 176/87 |
| 4,028,178 | 6/1977 | Jullien et al. | 176/38 |

*Primary Examiner*—Harvey E. Behrend
*Attorney, Agent, or Firm*—Cameron, Kerkam, Sutton, Stowell & Stowell

[57] ABSTRACT

The concrete vault roof of a liquid metal cooled fast reactor is provided with a heat-insulating lining plate and has a central passage for rotating shield plugs surrounded by passages for heat exchangers and pumps. An annular plate of relatively small thickness is placed horizontally beneath the vault roof and its external edge is joined to the lining plate by means of shaped members having a long radius of curvature so as to form closed spaces for trapping an inert gas. The free edges formed by the openings in the annular plate are joined to the lining plate by means of a sealing shell.

11 Claims, 3 Drawing Figures

LIQUID METAL COOLED NUCLEAR REACTOR

REFERENCE TO RELATED APPLICATION

This application is a continuation-in-part of our application Ser. No. 680,780 filed Apr. 27, 1976 for a liquid metal cooled nuclear reactor which application is now abandoned.

The invention relates to a liquid metal cooled nuclear reactor.

In more precise terms, the invention is directed to a fast reactor which embodies special and novel arrangements for ensuring thermal protection of the top shield structure or so-called vault roof of a nuclear reactor, by use of the thermo-siphon phenomenum in a tight gaseous space, said roof being intended to form a closure for the vessel containing the liquid metal which has a cooling function with respect to the inert gas located above said liquid metal and usually consisting of argon.

It is recalled that a top closure structure of the type just mentioned is usually constituted by a horizontal concrete slab which is provided with a sheet metal lining on those walls which are in contact with the inert gas, and with a water-cooling circuit.

The majority of the design solutions which have been contemplated prior to this invention with a view to providing thermal protection for the top closure structure or vault roof of a nuclear reactor are subject to disadvantages which make it difficult to carry them into practical effect in high-power reactors.

It is known for example that, when the reactor vault roof is protected by a cover-plate of substantial thickness placed beneath said roof and engaged within the top portion of the vessel wall, the thermal expansions imposed by changes in operating regime of the reactor give rise to excessive mechanical stresses in the zone of junction between the cover-plate and the reactor vessel.

It is also known that, in order to protect the vault roof of a reactor by covering the bottom wall of this latter with a metallic heat-insulating lining consisting of a plurality of layers defining spaces in which the blanket mixed with sodium vapor is trapped, it proves necessary to employ a special and very costly material which behaves in a satisfactory manner with respect to an inert gas charged with sodium vapor. Moreover, in a solution of this type, there is no means of preventing solid particles of cold sodium or oxides from clogging said heat-insulating lining.

The precise aim of the present invention is to provide a nuclear reactor which overcomes the disadvantages mentioned in the foregoing, especially by permitting satisfactory thermal protection of a reactor vault roof in a simple and practicable manner without entailing high construction costs.

Said reactor essentially comprises a cylindrical primary vessel and within said vessel a reactor core constituted by fuel assemblies, said primary vessel being intended to contain the liquid metal coolant above which is present a hot gaseous medium and being closed at the top by a concrete vault roof such that the roof walls in contact with said gaseous medium are covered by a sheet-metal plate or so-called roof lining plate, a vertical wall of said vault roof being located opposite to said primary vessel, said roof being provided on the one hand with a central passage for a system of rotating shield plugs and on the other hand around said central passage with a plurality of passages for heat exchangers and pumps. The reactor essentially comprises in addition an annular metallic plate of relatively small thickness placed horizontally beneath said vault roof, said annular plate being provided with openings located opposite to said passages and being intended to delimit with the roof lining plate closed spaces for trapping an inert gas, the internal edge of said annular plate defined by said central passage being joined to said roof lining plate in leak-tight manner, the external edge of said annular plate defined by said vertical wall of the vault roof being joined to said roof lining plate in leak-tight manner by means of connecting members having a long radius of curvature and the free edges delimited in said annular plate by said openings being joined to said roof lining plate by means of a sealing shell.

In accordance with the invention, the external edge of said annular plate can be joined in very long connection radii either directly to said roof lining plate or to the top portion of the reactor vessel or to the top portion of the baffle which protects said vessel and is concentric with this latter or to the bottom end of a shell which is concentric with said vessel. It is worthy of note that the long radii of connection between said annular plate and the roof lining plate serve to compensate for horizontal expansions of said metallic plate which constitutes a "flexible" cover-plate, said expansions being caused by changes in operating regime of the reactor, thereby limiting stresses in the junction zone of said cover-plate. Moreover, the sealing shells which serve to connect the edges formed in said plate by the openings to the metallic roof-lining plate are advantageously fitted with at least one bellows-type expansion seal.

In one alternative embodiment of the reactor, the thermal protection of the vault roof can be completed by a heat-insulating lining applied against the faces of the metallic roof-lining plate in oppositely-facing relation to the annular plate in order to ensure better distribution of the heat removed through all the cooling ducts which are arranged within the concrete structure of the vault roof, the gas thermosiphon being created in the closed spaces between the vault roof and the annular plate allowing the best use of the cooling pipes along the vault roof vertical parts.

Irrespective of the type of connection chosen between the external edge of the annular plate and the vault roof, the reactor in accordance with the invention can comprise in a preferential alternative embodiment panel constituted by the lateral wall of a cone frustum placed beneath the annular plate so that the largest cross-section of said cone frustum which is smaller in diameter than the reactor vessel delimits the bottom free edge of said panel which is supported by the extensions beneath the annular plate of the sealing shells.

The bottom free edge of the panel is designed in the form of a "trough" into which opens at least one tube said tube being immersed in the primary fluid of the reactor vessel.

The aforementioned panel serves to protect the annular metallic plate against heat radiation from the surface of the liquid sodium within the primary vessel.

In accordance with the invention, the annular metallic plate preferably has a thickness either smaller than or equal to 25 mm, the heat-insulating lining preferably has a thickness smaller than or equal to 5 cm and the panel has a thickness which is preferably of the order of 1 mm.

The characteristic features and advantages of the invention will become more readily apparent from the following description of exemplified embodiments of the reactor according to the invention which are given by way of illustration but not in any limiting sense.

This description will be given with reference to the accompanying drawings in which.

Figure 1:
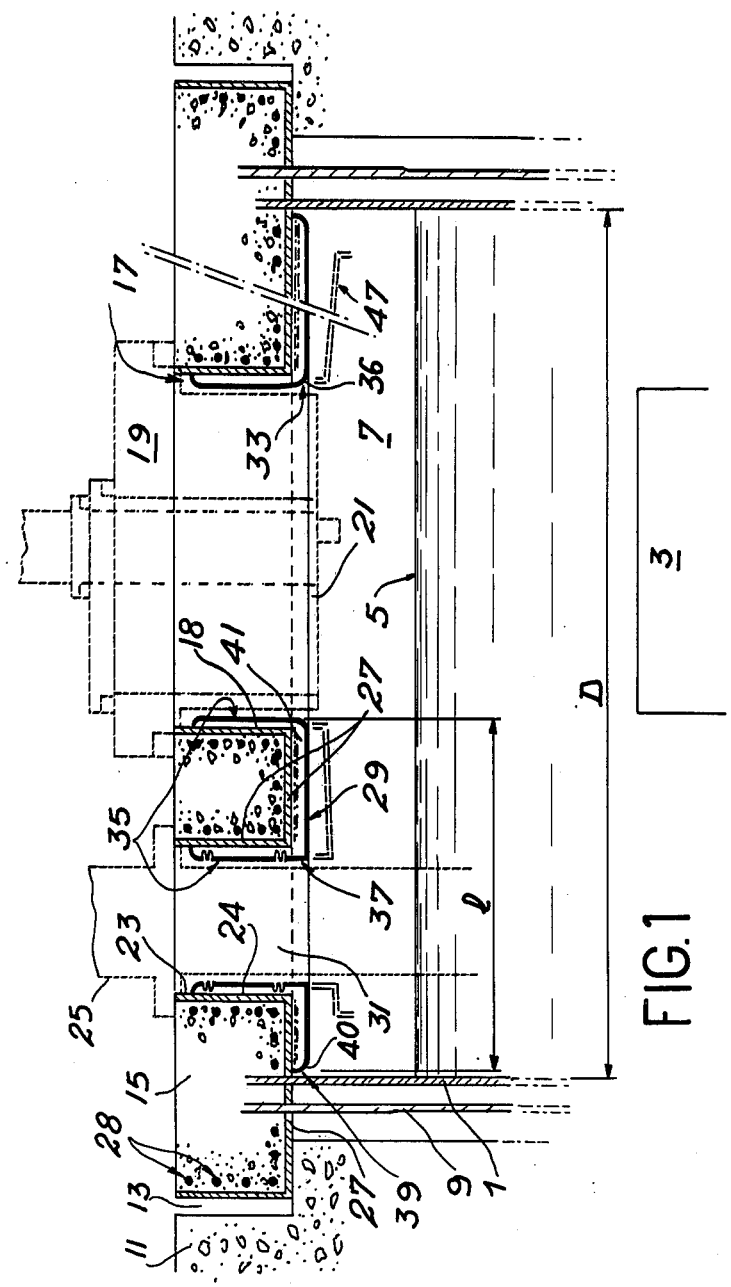
FIG. 1 is a diagrammatic axial sectional view of the upper portion of a liquid-metal cooled reactor embodying the novel arrangements of the invention for the protection of the concrete vault roof which closes the reactor.

In FIG. 1, the reference numeral 1 designates the primary vessel of a fast reactor which contains the liquid metal coolant, especially sodium, in which the reactor core 3 is immersed and which attains the level 5 within said vessel 1. An inert gas blanket 7 which usually consists of a mass of argon is present above said liquid metal coolant.

The primary vessel 1 as well as the leak-jacket 9 which surrounds this latter is placed within a biological shield structure 11 or reactor vault, there being provided at the top of said vault a large-diameter opening 13 in which is mounted a closure structure 15 or vault roof. Said roof 15 is provided on the one hand with an opening 17 delimitated by a vertical wall 18 of the vault roof for positioning a system 19 comprising two rotating shield plugs, said system 19 being protected by a heat-insulating lining 21, and on the other hand with passages such as 23 for mounting equipment units such as the unit 25 which are constituted either by the pumps or by the heat exchangers of the reactor, everyone of the passages 23 being delimitated by a vertical wall 24 of the vault roof. Moreover, said vault roof 15 which is constituted by a horizontal concrete slab is covered on those walls which are in contact with the blanket gas 7 by a sheet-metal plate 27 and is provided at the edge of said plate 27 with cooling ducts 28 arranged within the concrete structure.

In accordance with the essential feature of the invention, the vault roof 15 is provided with a heat shield consisting of an annular plate 29 which may be designated as a "flexible" cover-plate in contrast to the solution of the prior art which makes use of a cover-plate of substantial thickness. Said annular plate 29 has a thickness which is smaller than or equal to 25 mm and is placed horizontally beneath the vault roof 15.

Openings such as the opening 31 are formed in said annular plate 29 so as to correspond to each of the passages 23.

It is apparent that the internal circular edge 33 of said plate 29 is joined to the sheet-metal plate 27 which lines the vault roof 15 by means of a vertical annular sealing shell 35, the circular edge 33 aforementioned being joined to said shell 35 by means of a shaped plate having a long radius of curvature. It can also be seen that the free edge 37 of said shell 29 which is delimited by an opening 31 is also joined to said sheet-metal plate 27 by means of an annular sealing shell 35.

It is worthy of note that FIG. 1 corresponds to one of the alternative embodiments of the reactor in accordance with the invention since the external circular edge 39 of the annular plate 29 is in fact joined directly to the sheet-metal plate 27 by means of a shaped plate 40 having a long radius of curvature.

In accordance with the invention the plate 29 or roof delimitates with the vault roof 15 walls, closed spaces such as 41 in which a mass of inert gas, e.g. argon, is trapped.

Thus during the operation of the reactor an argon gas thermo-siphon is created between the plate 29 and the sheet-metal plate 27 lining the vault roof 15, which allows the evacuation of the calories accumulated by the argon gas in contact with the plate 29, through the vault roof 15 cooling circuit. It will be noted that in accordance with the invention the thermo-siphon efficiency is very great thanks to the very important surfaces of the vertical walls 24 and 18. Argon thermo-siphons are thought to be constituted by hot gas rising columns and cold gas down going columns distributed all around the passages and the central opening.

Figure 2:
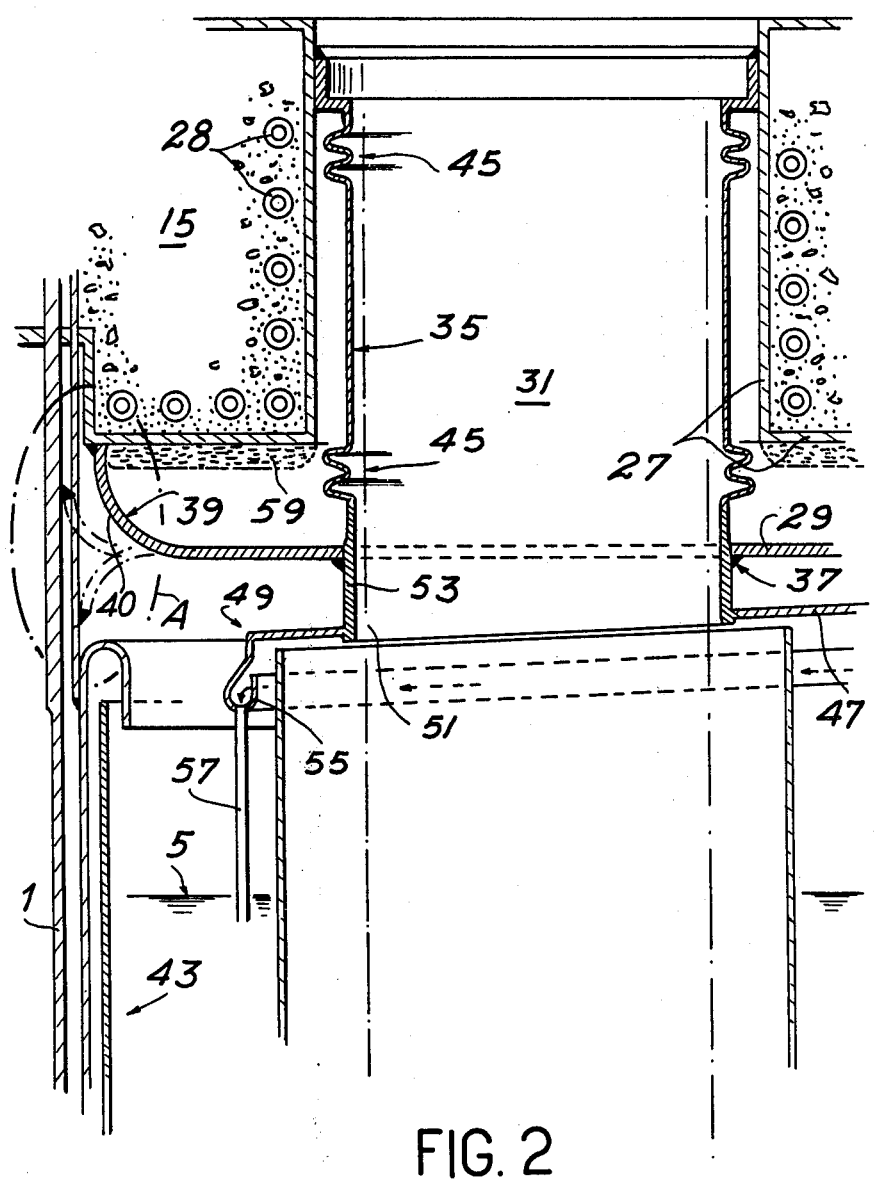
FIG. 2 is a diagrammatic partial view to a larger scale showing the reactor in accordance with the invention; in this view there are presented in parallel three first alternative forms of construction of the means adopted for connecting the external edge of said annular plate as well as the additional arrangements for perfecting these latter.

In FIG. 2, in which the same reference numbers designate the same parts shown in FIG. 1, a portion of the plate 29 which is an essential element of the device according to the present invention can be seen, this portion extending from the primary vessel 1, internally protected by a cylindrical baffle-plate 43, beyond an opening 31.

In A, are shown the three alternative embodiments of the present invention for joining the external edge 39 of the annular plate 29, this edge 39 being in fact possibly joined by means of a connecting member having a long radius of curvature 40 either to the baffle-plate 43, or to the primary vessel 1, or else directly to the sheet-metal plate 27.

In all these connection embodiments, Na vapors are prevented from penetrating into space 41.

In this figure it can be noted that the vertical annular sealing shells 35, by means of which the free edge 37 of the plate 29 is joined to the sheet-metal plate 27 inside a passage 23, are provided with bellows-type expansion seals 45 intended to limit the mechanical stresses developped by the expansion imposed by changes in the operating regime of the reactor.

Equally shown in FIG. 2, in accordance with a preferential embodiment of the device of the present invention, is a panel 47 constituted by the lateral wall of a cone frustum placed under the plate 29 in such a manner that the bottom free edge 49 of said panel 47 corresponds to the largest section of the said cone frustum of smaller diameter than that of the baffle-plate 43.

This panel 47 about 10 mm thick is perced by openings such as 51 along which openings it is supported by extensions 53 of the said sealing shells 35 under the plate 29.

Along the free edge 49 is made a "through" 55 in which a tube 57 immersed in the liquid metal of the vessel 1, opens.

Besides, it can be noted that, in accordance with another valuable embodiment of the device of the present invention, a light heat-insulating material 59 the thickness of which is comprised between 2.5 and 5 cm is applied on the sheet-metal plate 27 vis a vis the plate 29, allowing the evacuation by all the vault 15 cooling pipes of the calories of the argon gas trapped in spaces 41, the argon thermo-siphons allowing the best use of the pipes located along the walls 18 and 24 of the vault.

It should be noted that the heat-insulating material 59 being located in a sodium vapors-tight space, it may be of a very ordinary quality.

Figure 3:
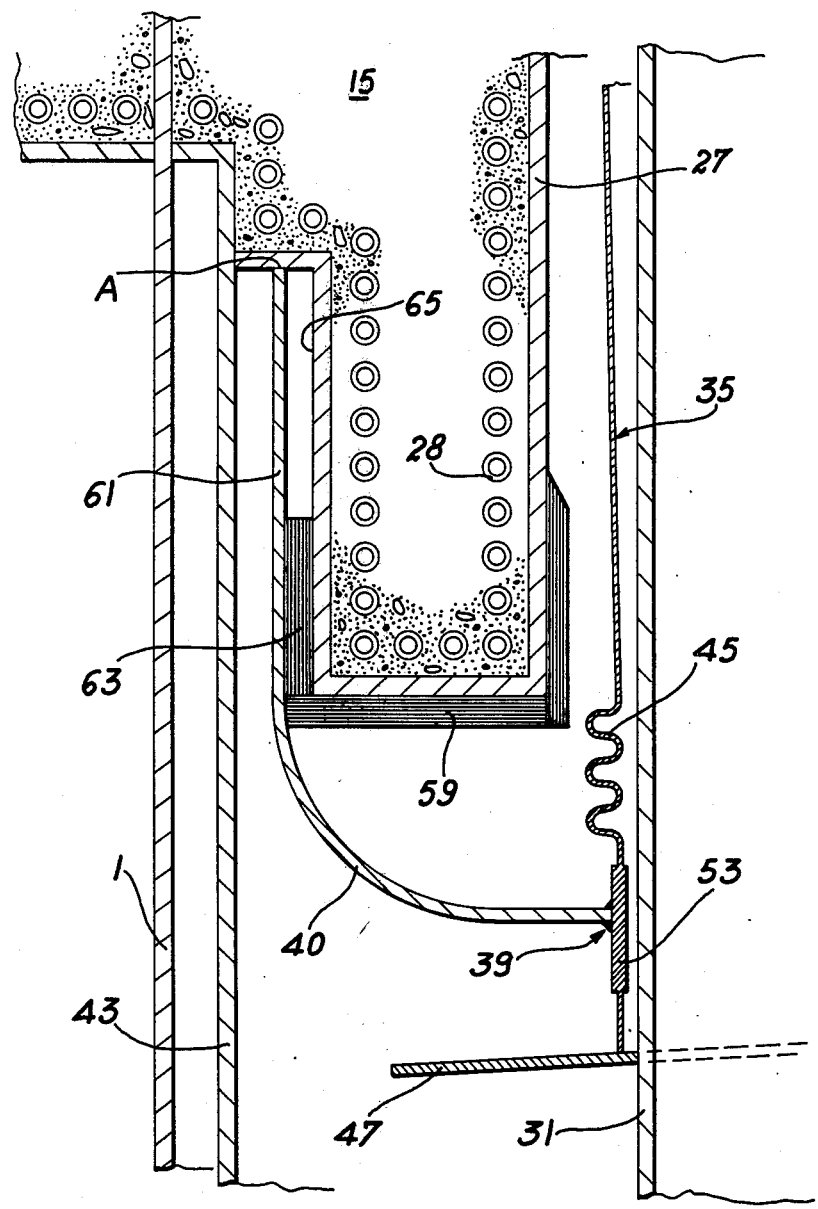
FIG. 3 is a diagrammatic partial view to a larger scale showing the reactor in accordance with a fourth alternative embodiment of the means adopted for connecting the external edge of said annular plate to the roof lining plate.

In FIG. 3, in which the same reference numbers designate the same parts shown in FIGS. 1 and 2, a fourth embodiment of the reactor in accordance with the present invention is shown in which the external edge 39 of the annular plate 29 is joined in A to the sheet-metal plate 27 lining the vault by means of a shell 61, the said edge 39 being joined to the said shell 61 by a connecting member having a long radius of curvature 40.

It can be noted in FIG. 3 that an heat-insulating cladding 63 may favourably be interposed between the vertical wall 65 of the said vault 15 and the said sealing shell 61, to avoid the formation of an argon gas thermo-siphon between the said wall 65 and the said sealing shell 61 to reduce the thermal gradient borne by the said sealing shell 61.

In view of FIG. 1, it can be noted that for a reactor in accordance with any one of the embodiments of FIGS. 2 and 3 having a primary vessel with a diameter D of about 20 m, the vault 15 protection may be obtained by an annular plate 29 of a width L of about 4 m the connecting members 36 and 40 of which have a curve radius in the range of 0.60 m. The opening 17 and the twelve passages 23 are thought to have a height of about 3 m, the opening 17 having a diameter of about 12 m and passages 23 a diameter of about 2.80 m.

Such connecting members for a plate of such width permit to limitate the stresses imposed by the expansion arising at the time of the change in the reactor operating regime in a very satisfactory manner.

It is specified that the average temperatures created in the thickness of the plate 29 for successive sodium temperatures of 250°, 530° and 700° are equal to 140°, 295° and 495° with the heat-insulating material 59 and without the panel 47.

What we claim is:

1. A liquid metal cooled reactor comprising a cylindrical primary vessel, a reactor core within said primary vessel, fuel assemblies in said core, a concrete slab roof closing said cylindrical primary vessel, a horizontal inner wall for said roof, a liquid metal coolant in said primary vessel, a hot gaseous medium above said liquid metal coolant, pumps and heat exchangers, a system of rotating shield plugs in said slab roof, a central opening in said roof for said system of rotating shield plugs, a first vertical wall for said roof delimitating said central opening, a plurality of passages in said roof for said heat exchangers and pumps, second vertical walls for said roof delimitating said passages, a third vertical wall for said roof located opposite to said primary vessel, a sheet metal plate covering said horizontal inner wall and said first, second and third vertical walls of said roof, a thermal protection device for said slab roof comprising an annular metallic planar plate of thickness smaller than and also equal to 25 mm extending beneath said slab roof parallel to said horizontal inner wall of said roof, an internal edge for said annular plate defined by said central opening, an external edge for said annular plate defined by said third vertical wall, openings in said annular plate located opposite to said passages for said heat exchangers and pumps, edges for said openings in said annular plate, a first vertical sealing shell surrounded by said first vertical wall of said roof, said first vertical sealing shell being fixely connected at one end to the inner edge of said metallic annular plate and at the other end to the sheet metal plate covering said first vertical wall of said roof at the upper part of said first vertical wall, second vertical sealing shells surrounded by said second vertical walls of said roof, each of said second vertical shells being fixely connected at one end to the edge of one of said openings in said metallic annular plate and at the other end to the sheet metal plate covering one of said second vertical walls of said roof at the upper part of said second vertical walls, said external edge of said annular metallic plate being connected to the sheet metal plate covering said third vertical wall of said roof by a connecting member, the radius of curvature of said connecting members being at least equal to 0.60 m, an inert gas trapped in closed space delimitated between said annular plate and said horizontal wall of said roof and between said first and second vertical walls of said roof and said first and second shells and means disposed in said roof along its horizontal inner wall and its vertical walls for evacuation of calories accumulated by said inert gas trapped in said closed spaces in contact with said annular plate.

2. Reactor according to claim 1 wherein means for evacuation of the calories of said inert gas trapped in said closed spaces comprise cooling ducts in said roof along its horizontal and vertical walls.

3. Reactor according to claim 1 wherein said external edge of said annular metallic plate is connected to said roof by said connecting members and by a top portion of said primary vessel.

4. Reactor according to claim 1 wherein said external edge of said annular metallic plate is connected to said roof by said connecting members and by a top portion of a baffle plate concentric with said primary vessel and within said vessel.

5. Reactor vessel according to claim 1 wherein said external edge of said annular plate is connected to said roof by said connecting members and by a third shell concentric with said primary vessel.

6. Reactor according to claim 1 wherein said internal edge of said annular plate is connected to the end of said first vertical shell by said connecting members.

7. Reactor according to claim 1 wherein said second shells include at least one bellows-type expansion seal.

8. A reactor according to claim 1, wherein a heat insulating material is interposed between said shell and said vertical wall of the reactor vault roof.

9. A reactor according to claim 1, wherein those faces of said vault roof lining plate opposite to said annular plate are covered with heat-insulating material.

10. A reactor according to claim 1 wherein the thickness of said annular metallic plate is smaller than and also equal to 25 mm.

11. A reactor according to claim 9, wherein the thickness of said heat-insulating material is within the range of 2.5 to 5 cm.

* * * * *